United States Patent [19]
Benz et al.

[11] Patent Number: 5,542,558
[45] Date of Patent: Aug. 6, 1996

[54] METHOD FOR MANUFACTURING MICRO-MECHANICAL COMPONENTS USING SELECTIVE ANODIZATION OF SILICON

[75] Inventors: Gerhard Benz, Boeblingen; Jiri Marek; Martin Willmann, both of Reutlingen; Frank Bantien, Ditzingen; Horst Muenzel, Reutlingen; Franz Laermer, Stuttgart; Michael Offenberg, Tuebingen; Andrea Schilp, Schwaebisch Gm ünd, all of Germany

[73] Assignee: Robert Bosch GmbH, Stuttgart, Germany

[21] Appl. No.: 308,245

[22] Filed: Sep. 19, 1994

[30] Foreign Application Priority Data

Sep. 18, 1993 [DE] Germany .......................... 43 31 789.7

[51] Int. Cl.⁶ ................................................. H01L 21/306
[52] U.S. Cl. .............................. 216/2; 216/99; 437/228; 437/234; 205/656; 205/661
[58] Field of Search ..................................... 437/228, 904, 437/234; 204/129.1, 129.3, 129.65; 156/653, 657, 662; 216/2, 95, 99

[56] References Cited

U.S. PATENT DOCUMENTS

| | | | |
|---|---|---|---|
| 4,628,591 | 12/1986 | Zorinsky et al. | 156/653 |
| 4,664,762 | 5/1987 | Hirata | 204/129.3 |
| 4,874,484 | 10/1989 | Foell et al. | 204/129.65 |
| 4,966,663 | 10/1990 | Mauger | 204/129.65 |
| 4,995,954 | 2/1991 | Guilinger et al. | 204/129.75 |
| 5,006,487 | 4/1991 | Stokes | 437/228 |
| 5,242,863 | 9/1993 | Xiang-Zheng et al. | 437/228 |
| 5,277,769 | 1/1994 | Medernach | 204/129.65 |
| 5,338,416 | 8/1994 | Mlcak et al. | 204/129.65 |
| 5,352,635 | 10/1994 | Tu et al. | 437/228 |

FOREIGN PATENT DOCUMENTS

| | | |
|---|---|---|
| 0226091 | 6/1987 | European Pat. Off. . |
| 4000903 | 8/1990 | Germany . |
| 4016472 | 4/1992 | Germany . |
| 4126954 | 2/1993 | Germany . |
| WO91/03074 | 3/1991 | WIPO . |

OTHER PUBLICATIONS

Watonobe et al, "Fabrication of Microbridges Using Oxidized Porous Silicon", Transactions of the Inst. of Electrical Eng. of Japan, vol. 112–A, No. 12, p. 974, abstract, Dec. 1992.

W. Lang et al., "Application of Porous Silicon as a Sacrificial Layer," The 7th International Conference on Solid--State Sensors and Actuators, pp. 202–204 (1993).

Primary Examiner—George Fourson
Assistant Examiner—Thomas G. Bilodeau
Attorney, Agent, or Firm—Kenyon & Kenyon

[57] ABSTRACT

A method for manufacturing micro-mechanical components in which a structure is produced on a silicon layer, which is to be undercut in a further step. The silicon is selectively anodized for this undercutting operation. Thus, the method enables the manufacturing of micro-mechanical components that can be integrated together with bipolar circuit elements.

5 Claims, 2 Drawing Sheets

METHOD FOR MANUFACTURING MICRO-MECHANICAL COMPONENTS USING SELECTIVE ANODIZATION OF SILICON

FIELD OF THE INVENTION

The present invention is directed to a method for manufacturing micro-mechanical components by producing a structure on a silicon layer and by subsequently undercutting the silicon layer beneath the structure by means of anodization.

BACKGROUND INFORMATION

A method for manufacturing micro-mechanical acceleration sensors, in which a vibration reed is etched out of a two-layer supporting material in the top layer, is described in German Patent Application No. 40 00 903. While the substrate arranged below the flexural reed is being etched, an electric potential is applied across sections of the top layer to protect the flexural reed from being etched thereby enabling the flexural reed to be undercut.

PCT International Publication No. WO 91/03074 describes a method for introducing trenches into a semiconductor surface and for covering the side walls of these trenches with a silicon oxide. The trench bottoms are not covered with oxide and are, thus, used as starting points for undercutting the structures formed by the trenches.

A method for undercutting silicon structures by anodization is described in the article by Langet al., "Application of Porous Silicon as a Sacrificial Layer," *The 7th International Conference on Solid-State Sensors and Actuators*, pp. 202–204 (June 1993).

Unfortunately, the above-mentioned methods of undercutting are not necessarily compatible with other processes used in fabricating semiconductor electronics. Thus, there exists a need for a method of undercutting that is compatible with other semiconductor fabrication processes.

SUMMARY OF THE INVENTION

With the method of the present invention, the anodization of silicon is compatible with many other processes of semiconductor electronics. This is because a structure, which consists at least partially of silicon of a specific doping, is introduced on a silicon layer having a higher doping. The silicon layer is undercut by anodization. Consequently, altogether new kinds of micro-mechanical components can now be produced. Moreover, the manufacturing of known micro-mechanical components can be simplified.

Through the application of multilayer substrates, an especially exact dimensional control of the undercut regions and of the structures can be achieved. The dopant concentration can be varied to influence the anodization characteristics, i.e., from very rapidly anodizing to hardly anodizing at all.

Depending upon the anodization potential, the silicon can either be removed (e.g., abrasively cut) or converted into porous silicon, which is then removed in a subsequent process step. Thus, many possible etching methods are available, each of which can be used depending on the other requirements with respect to the structure or manufacturing method. Anodizing in hydrofluoric acid is particularly simple. Such anodization is also easy to use in conjunction with circuits of semiconductor electronics. In particular, protecting already finished circuits is possible by applying a simple covering of photo-resist prior to the attack of the hydrofluoric acid.

Using a two-layer substrate simplifies the production of the micro-mechanical components. Applying an additional layer permits the geometric dimensions of the micro-mechanical component to be precisely controlled. Furthermore, these types of multilayer substrates can also accommodate standard-type circuit elements, and the process steps for manufacturing the circuits can also be used for manufacturing the micro-mechanical components.

Multilayer substrates having a buried insulating layer can also be used. These substrates allow the manufacturing of especially insensitive circuits. The anodization can follow quite simply by means of contacting on the side of the multilayer substrate facing away from the etching medium.

DETAILED DESCRIPTION

Figure 1:
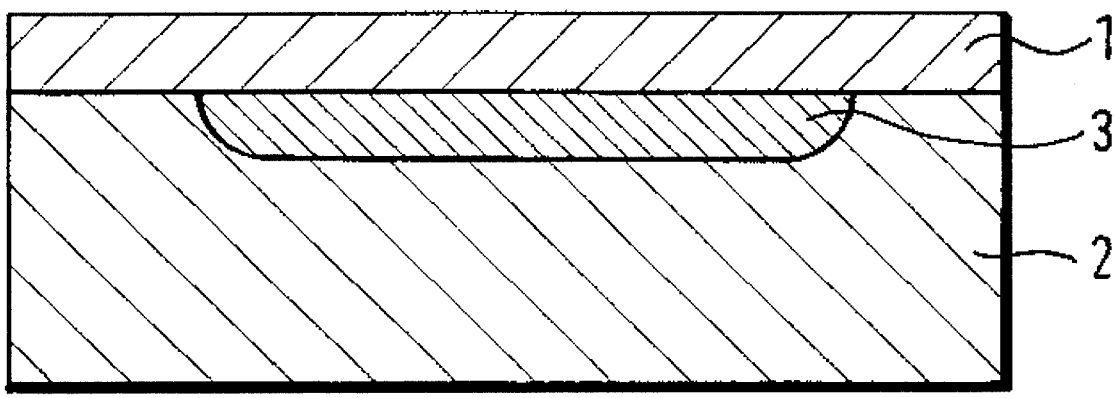
FIGS. 1 through 3 illustrate a first exemplary embodiment of the method according to the present invention.
Figure 2:
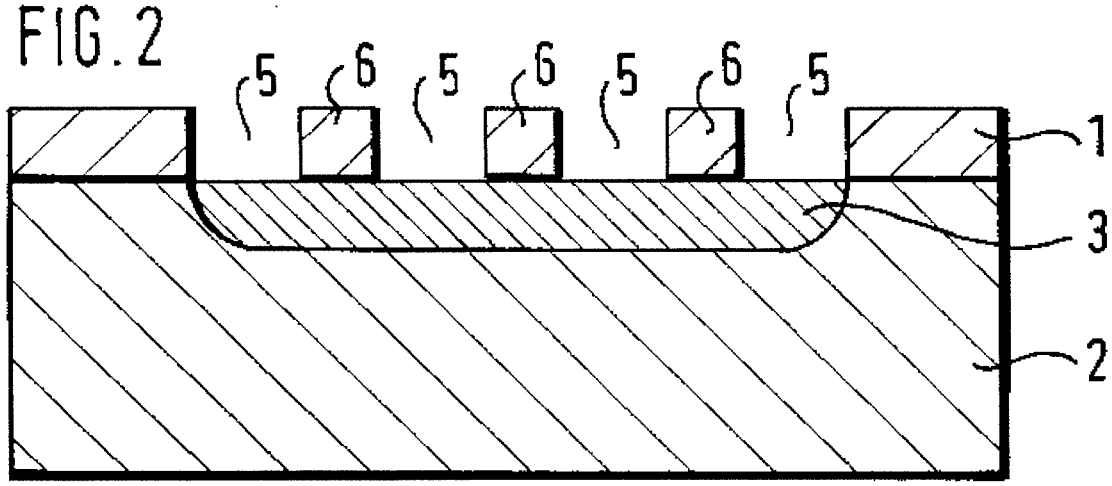
Figure 3:
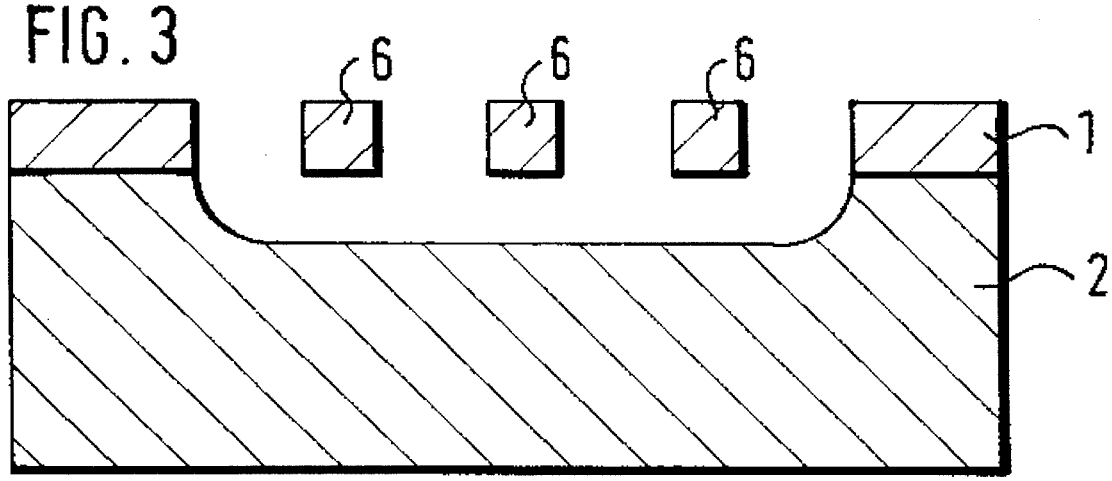

FIGS. 1 through 3 illustrate a first exemplary embodiment of the method according to the present invention. FIG. 1 shows a multilayer substrate having an upper silicon layer 1 (cover layer), a lower silicon layer 2 (substrate), and an additional silicon layer 3 (buried layer). The manufacturing of a multilayer substrate of this type is well known, for example, from the manufacturing of bipolar circuits. To this end, dopants are initially introduced in a silicon substrate 2 by implantation or diffusion to form the buried layer 3. A cover layer 1 is then produced on the top side of the silicon substrate 2 by an epitaxial process or another suitable process. It is also possible to apply a thin silicon plate to the silicon substrate 2 as the cover layer 1 through bonding processes.

Trenches 5, which define structures 6, are introduced using a suitable etching process, as shown in FIG. 2. However, the structures 6 can also be produced using additive processes, in which structures 6 are added to the additional silicon layer 3. In a subsequent process step. (see FIG. 3), the structures 6 are undercut, i.e., the buried layer 3 arranged under the structures 6 is removed.

In the method of the present invention, to allow the previously defined silicon structures 6 to be freestanding, i.e., to undercut them, the electrochemical etching characteristics of diluted, aqueous hydrofluoric-acid solutions are used. In some instances, the diluted aqueous hydrofluoric-acid solutions can be buffered with additives, such as ammonium(bi)fluoride, ammonium acetate, acetic acid or with a suitable mixture of these components.

When silicon is anodized in aqueous (buffered or unbuffered) hydrofluoric-acid solution, there are three regions having different etching characteristics due to different applied electric anodization potentials and anodization current densities resulting. In a first region having, in terms of amount, relatively low electric anodization potentials and an exponential current/voltage characteristic, porous silicon is formed over the entire surface on the top silicon surface that is in contact with the etching solution. The properties of the porous silicon produced during anodization essentially depend on the hydrofluoric-acid concentration, the anodization current density, and the silicon doping.

Given an increasing electric potential in terms of amount, i.e., an increasing current density, the current density/voltage characteristic changes into a flatter, nearly linear waveshape. In this characteristic second region, the wafer surface is only still partially converted into porous silicon. Other parts of the surface are etched normally. At a third region with still higher anodization potentials, the current density becomes saturated, and the entire wafer surface is etched thereby causing a polishing effect (electropolishing).

At low concentrations of hydrofluoric-acid, saturation of the anodization current density and, thus, electropolishing occurs at relatively low anodization potential values. On the other hand, as the concentration of hydrofluoric acid increases, the current saturation is shifted to higher values, thereby promoting the formation of porous silicon.

Moreover, the above described effects depend on the silicon doping to a considerable extent. Given an identical applied anodization potential, $p^+$-regions and $n^+$-regions (doping $>10^{17}/cm^3$) are preferably transformed into porous silicon (or dissolved). Clearly slower $p^-$-silicon regions and extremely slow $n^-$-regions (doping $<10^{16}/cm^3$) decrease the current density to such an extent that etching is stopped. Thus, more heavily doped sacrificial layers can be selectively dissolved up to less heavily doped silicon regions or preferably up to $n^-$-doped regions.

To etch free-standing structures, the rear side of the silicon wafer is suitably contacted (via an electrolyte or via a metallic contact) by an anodic potential, while the front side of the silicon wafer, which is appropriately passivated, if indicated at the necessary location (for example by means of photo-resist), is subjected to an aqueous hydrofluoric-acid solution, into which a suitable counter-electrode (for instance palladium or platinum) is immersed.

In this case, the more heavily doped, buried silicon layer 3 (or the buried, more heavily doped silicon regions) are selectively dissolved up to the less heavily doped regions above and below it, and especially selectively dissolved opposite $n^-$-silicon, depending on the level of the applied anodization potential of the anodization current density produced by it (or of the hydrofluoric-acid concentration). Thus, the less heavily doped structures are directly etched to be free standing from the more heavily doped structures, or transformed into porous silicon.

Thus, both a vertical as well as a lateral dimensional control of the dissolved or transformed regions is provided when locally limited higher doping concentrations are applied by masked diffusion or by ion implantation.

If the anodization potential (or the anodization current density produced by it) is selected to be low enough to allow a conversion into porous silicon, then the porous silicon can be quickly and selectively thermally oxidized. The buried anodized region is thus converted into a buried oxide. For this purpose, the silicon is exposed to a hydrous and oxygen-containing gas at temperatures of about 800°–1100° C. Subsequently, the thus treated wafer can, if necessary, be subjected to still further high-temperature process steps, for example to alter its doping (high-temperature diffusion). The oxide formed can then be selectively dissolved with hydrofluoric acid.

Alternatively, when the selective oxidation beneath the structures to be undercut to form free-standing structures is concluded, the resultant porous silicon can be dissolved quite quickly by briefly raising the anodization potential (or the anodization current density) up to the electropolishing range.

Alternatively, the porous silicon that has been selectively produced under the structures to be cut free can be very quickly and selectively dissolved in:

alkaline (NaOH, KOH) or ammoniacal ($NH_4OH$, TMAH) aqueous solutions, which can preferably be used as cold solutions;

solutions of aqueous hydrofluoric acid (HF) and an oxidizing agent such as $H_2O_2$ or $HNO_3$ or $HClO_3$, or $K_2Cr_2O_7$ or $CrO_3$, in some instances with the addition of buffers (such as $CH_3COOH$); or a vapor mixture of HF and $HNO_3$ or HF and $H_2O_2$. If the anodization process is carried out at a high anodization potential, i.e., in the electropolishing range, then the silicon is immediately dissolved, without porous silicon first forming, given a possibly diminished doping selectivity.

All the indicated process sequences lead to free-standing structures on the front side of the silicon wafer. Structures of monocrystalline silicon can be produced quite advantageously, so that the outstanding mechanical properties of monocrystalline silicon can be used. Furthermore, an electronic circuit can be integrated in such a silicon layer.

Doping layer arrangements that are suitable for the described process are listed in the following:

| Layer | 1 | 2 | 3 | 4 | 5 | 6 |
|---|---|---|---|---|---|---|
| Covering layer | $n^-$ | $n^-$ | $p^-$ | $p^-$ | $p^-$ | $n^-$ |
| Buried layer | $p^+$ | $n^+$ | $n^+$ | $p^+$ | $n^+$ | $n^+$ |
| Substrate | $p^-$ | $p^-$ | $p^-$ | $p^-$ | $n^-$ | $n^-$ |

$n^-, p^- \approx 10^{15} \ldots 10^{16}/cm^3$; $n^+; n^+, p^+ \sim 10^{17} \ldots 10^{18}/cm^3$).

The first two doping layer arrangements correspond both in their sequence as well as in their doping concentrations to wafer structures customarily used in bipolar processes and are, therefore, especially advantageous. In the case of a buried $n^+$-layer in a p-substrate, the anodization process is limited almost exclusively to the $n^+$-regions. The anodization process is increasingly retarded as the boundary areas of the n-doped region are approached due to the decreasing n-dopant concentration. The anodization continues to decrease until it comes to a complete halt at the p-n junction (the region of the p-n junction represents an insurmountable barrier for the process).

With anodization etching, the electric potential is applied from the rear side of the wafer, and not from the front side of the wafer as is done in electrochemical etching in alkaline etching media (pn etch-stopping technique). The electrical contacting of the rear side can take place via the electrolyte itself by submerging the wafer into the solution between two electrode plates. Otherwise, a metal-plated wafer rear side is used, In the latter case, the metallized wafer rear side with the electrical contact can be reliably protected from diluted hydrofluoric-acid solution either by polymer material (for example, photo-resist) or by applying an "etching box." On the other hand, it is quite difficult to protect a front-side contact during etching operations in alkaline media using conventional techniques.

The definitively occurring p-n junctions (diodes) are biased in the forward direction, not in the reverse direction. Unlike the electrochemical etching stop in the alkaline media, any existing barrier layer defects in the large-surface p-n junctions do not cause damage. In particular, this technique permits buried sacrificial layer regions, not directly accessible to an electrical contacting, to be connected to anodization potential via the appropriately biased substrate.

Figure 4:
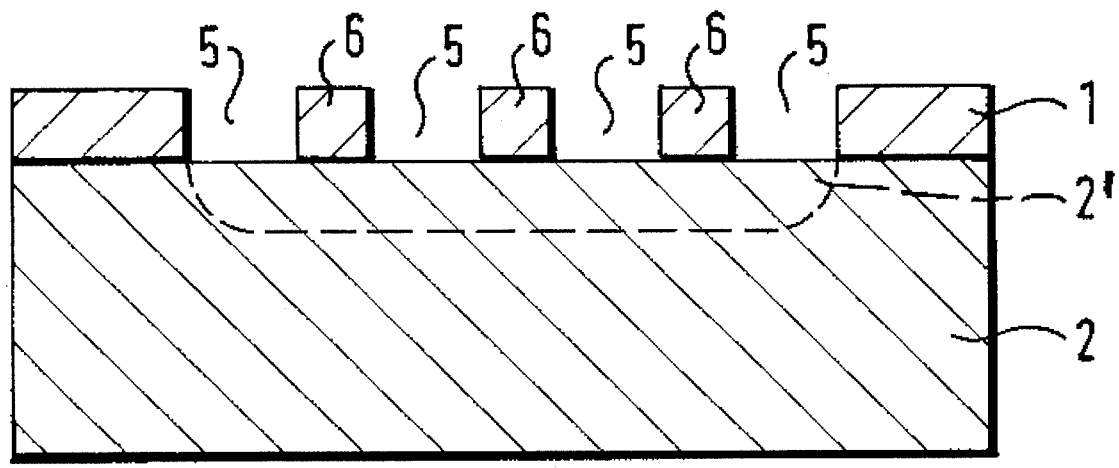
FIGS. 4 and 5 each illustrate a further exemplary embodiment of the method according to the present invention.

Another exemplary embodiment of the method according to the present invention is illustrated in FIG. 4. The multilayer substrate shown in FIG. 4 has only one upper silicon layer 1 and one lower silicon layer 2. Trenches 5, which define a structure 6, are again introduced into the upper silicon layer 1. The doping of the upper covering layer 1 is comparatively small. If an anodization solution and a corresponding potential are applied via the trenches 5 to this multilayer substrate, then a region 2' is anodized below the trenches and below the structures 6. Given an appropriate potential, the region 2' can be removed during the anodization step. Alternatively, the region 2' could be converted into porous silicon. This porous silicon can then be again selectively etched against the remaining silicon or be converted into a silicon oxide which can be subsequently etched.

Therefore, the method according to the present invention can be applied to multilayer substrates as well, which only have an upper silicon layer 1 and a lower silicon layer 2. It is only important that the upper silicon layer 1 have a doping of less than $10^{16}/cm^3$. If the upper silicon layer 1 is of the p-type, then the lower silicon layer can have a p-standard doping or a $n^+$ or $p^+$-doping of more than $10^{17}/cm^3$ (possible here are $p-p^+$; n-p; $n-p^+$; $n-n^+$; $p-n^+$).

Figure 5:
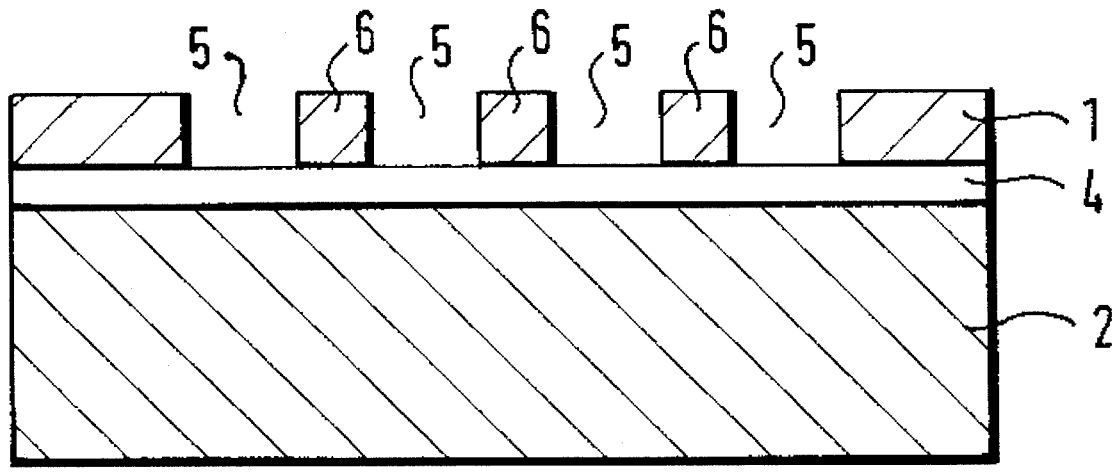

FIG. 5 illustrates another exemplary embodiment of the method according to the present invention. FIG. 5 shows a multilayer substrate, including an upper silicon layer 1, a lower silicon layer 2, and an insulating layer 4 (SOI-wafer structure) arranged between these silicon layers. Structures 6 are again defined in the upper silicon layer 1 through the introduction of trenches 5. In this case, the insulating layer 4 can also be used to precisely control the depth of the introduced trenches 5. Thus, an especially exact control of the geometric dimensions of the structures 6 is achieved. The insulating layer 4 must now be removed prior to the undercutting.

A particularly suitable material for this insulating layer is, for example, silicon oxide, which is etched upon Immersion of the multilayer substrate when hydrofluoric acid is used as the anodization solution. Thus, if silicon oxide is used for the insulating layer 4, a separate process step to remove this insulating layer 4 is not needed. After or during the removal of the insulating layer 4 below the trenches 5, the further processing, similar to the description with reference to FIG. 4, above, can take place. The multilayer substrate used in FIG. 5 with an insulating layer 4 can similarly be used in conjunction with a buried layer.

What is claimed is:

1. A method for manufacturing a micro-mechanical component from a multilayer substrate having an upper layer, a lower silicon layer, and an additional silicon layer arranged between the upper layer and the lower silicon layer, comprising the steps of:
 a) producing a structure in the upper layer, the structure being formed at least partially of silicon of a first doping, the additional silicon layer having a higher doping than the structure; and
 b) undercutting the additional silicon layer adjacent to the structure, wherein the step of undercutting includes the sub-step of anodizing the additional silicon layer, and wherein the upper layer has an n-doping and the lower silicon layer has a p-doping.

2. The method according to claim 1 wherein the upper silicon layer has a dopant concentration of less than $1\times10^{16}/cm^3$ and the additional silicon layer has a dopant concentration of greater than $1\times10^{17}/cm^3$.

3. The method according to claim 1, wherein hydrofluoric acid is used to anodize the additional silicon layer.

4. A method for manufacturing a micro-mechanical component from a multilayer substrate having an upper layer, a lower silicon layer, and an insulating layer disposed between the upper layer and the lower silicon layer, comprising the steps of:
 a) producing a structure in the upper layer by introducing trenches into the upper layer;
 b) removing the insulating layer at least in an area of the trenches by immersion in a solution; and
 c) undercutting the structure, the undercutting step including anodizing the lower silicon layer with the solution, wherein the upper layer includes monocrystalline silicon.

5. A method for manufacturing micromechanical components, the method comprising the steps of:
 a) preparing a p-doped silicon substrate having a dopant concentration of less than $1\times10^{16}$ cm$^{-3}$;
 b) diffusing a structured heavily n-doped layer having a dopant concentration of more than $1\times10^{17}$ cm$^{-3}$ into the silicon substrate;
 c) depositing an n-doped epitaxy layer having a dopant concentration of less than $1\times10^{16}$ cm$^{-3}$ onto the silicon substrate;
 d) introducing trenches into the epitaxy layer, the trenches extending through the epitaxy layer up to the heavily n-doped layer;
 e) anodizing the heavily n-doped layer by:
  i) applying an electric potential across the layers, and
  ii) applying etching solution through the trenches to the heavily n-doped layer; and
 f) removing the anodized layer.

* * * * *